J. JAMISON.
RESILIENT WHEEL.
APPLICATION FILED JAN. 9, 1917.

1,251,382.

Patented Dec. 25, 1917.
3 SHEETS—SHEET 1.

John Jamison, Inventor

By Mason Fenwick Lawrence, Attorneys

J. JAMISON.
RESILIENT WHEEL.
APPLICATION FILED JAN. 9, 1917.
1,251,382.
Patented Dec. 25, 1917.
3 SHEETS—SHEET 2.
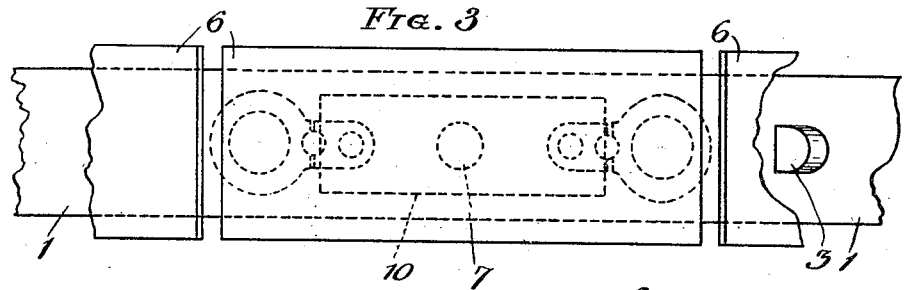
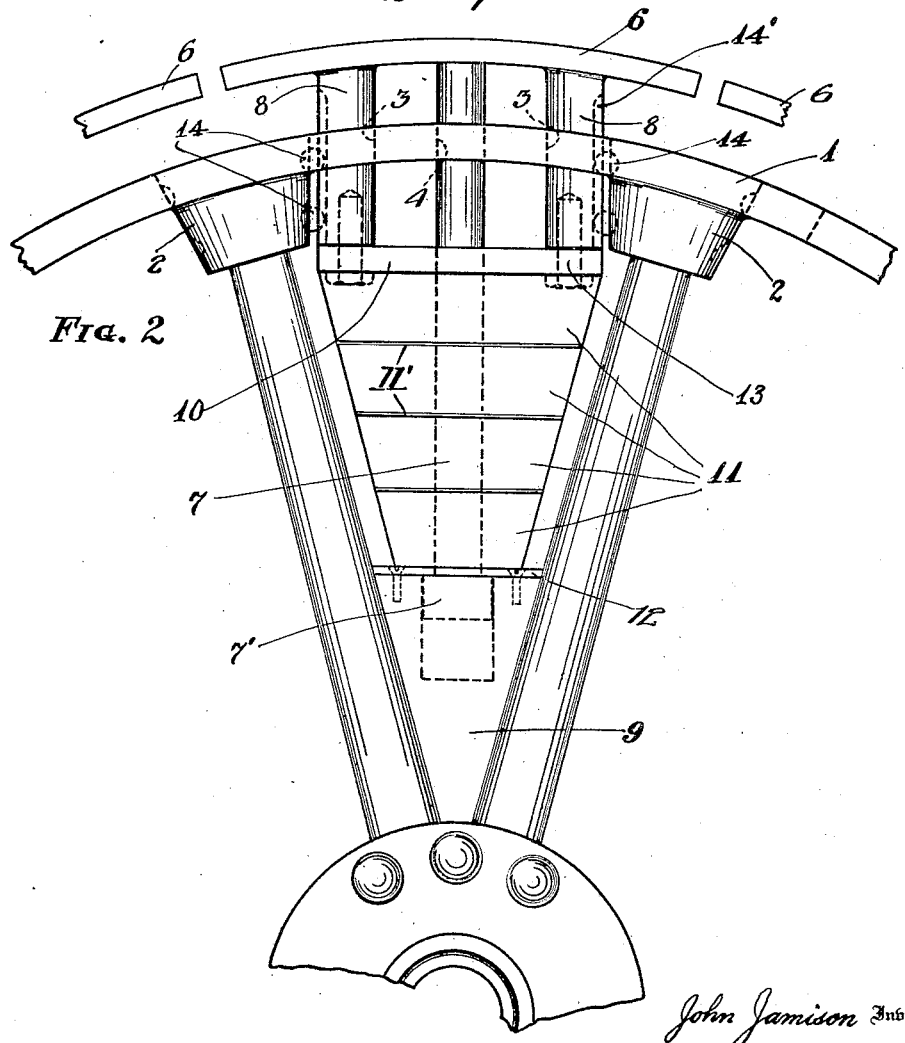
John Jamison Inventor
By Mason Fenwick Lawrence,
Attorneys J. JAMISON.
RESILIENT WHEEL.
APPLICATION FILED JAN. 9, 1917.
1,251,382.
Patented Dec. 25, 1917.
3 SHEETS—SHEET 3.
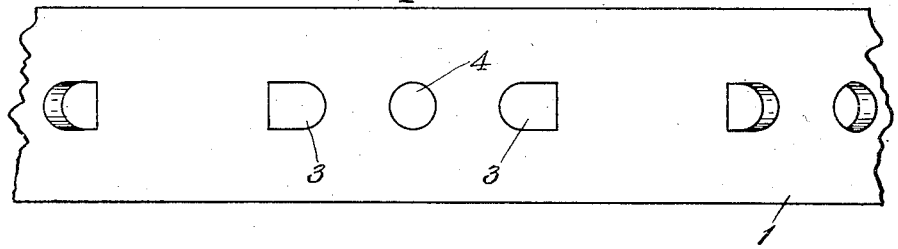
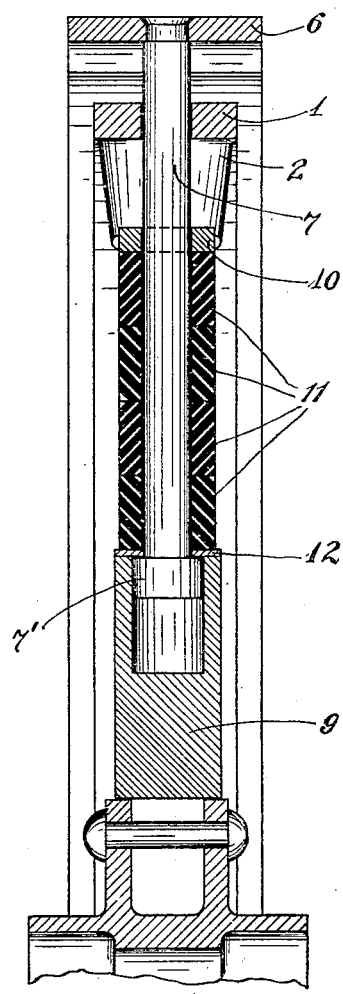
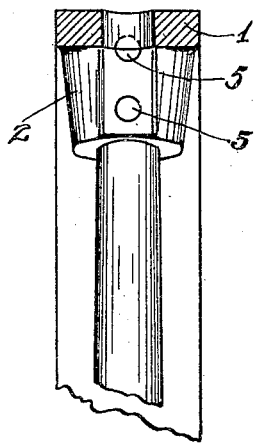
John Jamison, Inventor
By Mason Fenwick Lawrence, Attorneys

UNITED STATES PATENT OFFICE.

JOHN JAMISON, OF LAFAYETTE, COLORADO.

RESILIENT WHEEL.

1,251,382.

Specification of Letters Patent.

Patented Dec. 25, 1917.

Application filed January 9, 1917. Serial No. 141,455.

*To all whom it may concern:*

Be it known that I, JOHN JAMISON, a citizen of the United States, residing at Lafayette, in the county of Boulder and State of Colorado, have invented certain new and useful Improvements in Resilient Wheels; and I do hereby declare the following to be a full, clear, and exact description of the invention, such as will enable others skilled in the art to which it appertains to make and use the same.

This invention relates to wheels, and more particularly to resilient wheels.

It is an object of the present invention to provide a wheel structure having a substantially rigid central structure and provided with an annular sectional tire composed of a series of relatively independently and yieldably mounted shoe members.

Another object of the invention is to provide a resilient wheel structure having a yielding or cushioning sectional tire composed of a series of circumferentially disposed tread members joined rigidly to a carrying structure adapted for guided yielding movement in the rigid felly structure of the wheel, and particularly to eliminate the use of metallic springs or other elements likely to be readily broken or injured and necessitating frequent renewal or replacement.

Another object of the present invention is to provide a resilient wheel structure providing a substantially rigid central body portion having a series of shoes each substantially a duplicate of the others and interchangeable, and which may be quickly mounted or dismounted, renewed or replaced, and in which the several parts are simple, substantial, and comparatively inexpensive.

Another object of the present invention is to provide a resilient wheel having a tire structure consisting of a series of outer traction or tread members which are rigidly secured to a carrying portion slidably mounted in the central felly bearing part of the wheel, and to provide for the sliding movement without material friction of the shoe structure upon its adjacent bearing part of the central wheel member.

With these and other objects in view the invention consists of a suitable rigid central wheel structure having a felly provided with a sectional tire consisting of a number of shoes provided with traction surfaces outside of the felly and having within the felly plates or bearing members resting upon an expansive support consisting in the present instance of a pile of superposed rubber or other elastic blocks, and further consists of means for preventing relative movement of the blocks with respect to their respective shoes.

In the present specification and accompanying drawings a preferred form of the invention is illustrated, in which:

Fig. 2 is an enlarged detail of a fragment of the wheel structure showing one of the complete shoe units and a modified yielding support therefor.

Fig. 3 is a plan view thereof.

Fig. 4 is a plan view of a fragment of the wheel felly.

Fig. 5 is a transverse section taken on a radial line through the wheel, and

Fig. 6 is a detailed view, partly in section and partly in elevation, of the outer end of one of the spokes of the wheel, showing the bearing pockets of the anti-friction device.

Figure 1:
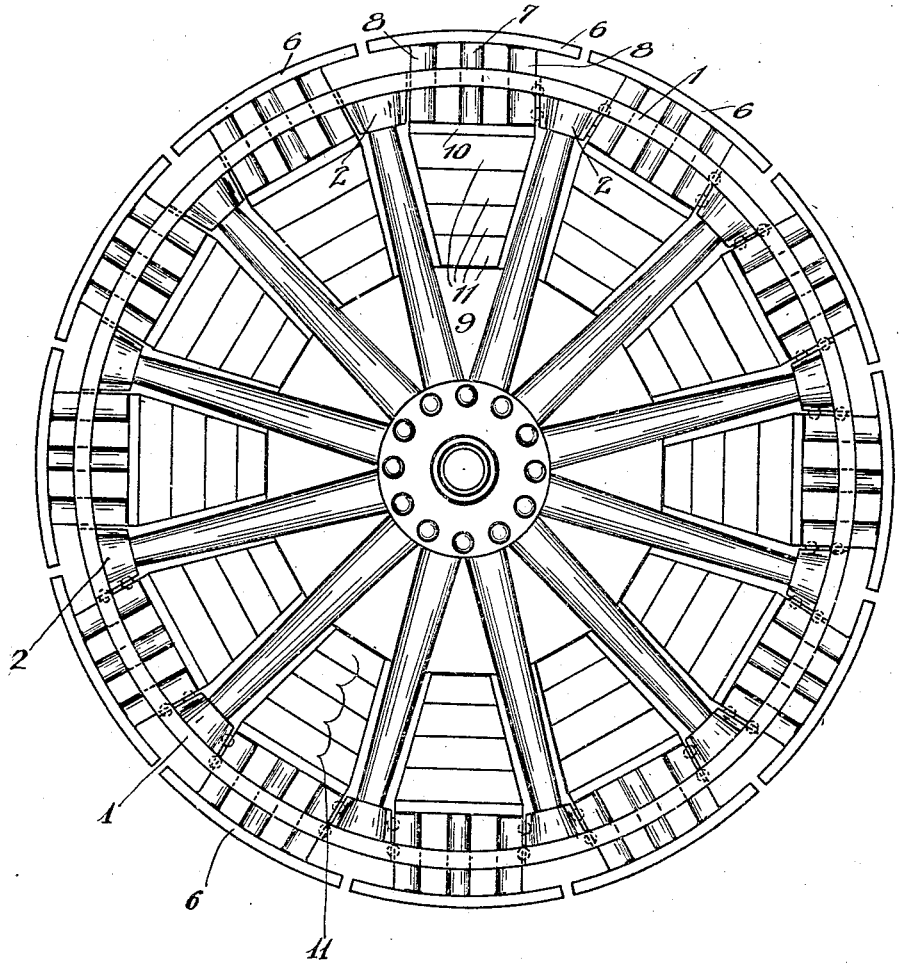
Figure 1 is a side elevation of a complete or assembled wheel structure.

In the illustrated form of the invention 1 represents a substantially continuous, preferably rigid, felly having on its inner surface a plurality of socket devices 2 in which may be mounted the outer ends of the spokes of the wheel when the central portion of the wheel is of the spoke type, it being understood, of course, that if preferred a central wheel portion consisting of a disk may be substituted in lieu of a spoked wheel center. The felly 1 is provided, as shown in Fig. 4, with a series of apertures 3 having parallel axes and intermediately disposed between a coördinate pair of the apertures 3 there is provided a plain circular aperture 4 through which there is adapted to radially project inwardly a central stem 7 on the outer end of which there is rigidly connected an arcuate plate or tread member 6 of suitable length and width and which forms the tractive member of the tire. In the form of the device illustrated in Figs. 2 and 3, the traction plate 6 is shown as provided with a pair of substantially parallel posts 8—8 arranged parallel with the radial stem 7 and which fit and are yieldably guided through the respective apertures 3—3, Fig. 4.

The radial stem member 7 connected to the shoe 6 projects inwardly toward the hub or central portion of the wheel and is provided with a head 7' which fits in a chamber or pocket in a wedge-shaped block or support 9, one of which is disposed between each adjacent pair of the wheel spokes.

Secured to the inwardly projecting ends of the posts 8—8 there is provided a cross tie plate 10 which, while it may be suitably connected to the ends of these posts, is here shown as fastened in position by means of screws 13 threaded into the ends of the posts and the heads of which are shown as seated within the outer end of a yielding, resilient or elastic support or cushion body resting at its inner end upon a plate 12 secured to the inner respective wedge or support 9 above mentioned. This cushion or elastic support preferably consists of rubber and is here shown as comprising a series of blocks 11—11 each outwardly increasing in length so as to form a substantial wedge between the respective pairs of spokes, the smallest block resting upon the plate 12 and the outer and largest block resting upon the tie plate 10, the whole acting expansively to project the shoe structure, consisting of the posts 8—8, and the tie plate 10, and the traction plate 6, outwardly to a position limited by the engagement of the head 7' of the shank or stem 7 of the shoe with the stop plate 12 resting upon the central block 9.

When the several shoe structures are assembled upon the felly 1 of the wheel and the cushion structure, consisting of the superposed blocks 11 arranged between the inner support 12 and the shoe tie plate 10, the cushions act to maintain the traction plates 6 outwardly in a substantially continuous circle or tire arrangement, and as the wheel rolls along a roadway, the traction plates 6 each successively and independently from the others yields as it comes into contact with the roadway, the desired cushioning effect being obtained by the reaction of the superposed rubber blocks 11—11 forming the cushioning support interposed between the central wheel structure and the respective bearing plate of each shoe. For the purpose of reducing the friction and taking up the end thrust upon the shoes as they roll into contact with the ground, I prefer to provide anti-friction devices so arranged as to take the thrust and which are interposed between the surfaces of the posts 8—8 and the adjacent portions of the spoke sockets 2—2, as illustrated in Figs. 3 and 6. While any suitable form of anti-friction devices may be employed, in this instance I have shown rolling members in the form of balls 14 which engage and slide in ball tracks 14' formed in the outer surfaces of the respective posts 8—8 and which rest in complementary seats 5 formed in adjacent surfaces of the spoke sockets 2—2.

From the foregoing it will be seen that since each of the shoe structures, consisting of the posts 8—8 and their respective traction plates 6 and tie plates 10, are duplicates of each other, they may be transported from one position to another about the wheel felly, may be easily mounted in position, and each comprises relatively simple and inexpensive pieces so as to permit ready removal of the parts in the event of fracture or damage or wear. By utilizing a cushion structure consisting preferably of a body of rubber, shown in this instance as a number of superposed blocks, it will be readily apparent that I have eliminated the metallic springs and thereby have avoided the liability of such cushioning elements crystallizing and breaking and therefore requiring frequent renewal of the cushions.

It will be evident that, without in any manner departing from the spirit of this invention, suitable devices, or partitions of metal 11', or other material may be inserted between the resilient blocks 11, at the dividing lines between said blocks, as clearly shown in Fig. 2 of the drawing.

What is claimed as new is:

1. In a resilient wheel, an annular series of peripheral shoes, a rigid spoked felly, and a cushion, for each shoe, comprising a radial set of superposed elastic blocks respectively increasing in bulk outwardly and disposed between the spokes.

2. A resilient wheel comprising a rigid body and felly, a series of shoes having peripheral plates forming a sectional tire, said shoes having guided relation with the felly to prevent relative rotation and having each a member inside said felly, a cushion of resilient material interposed between said inner member and the central portion of the wheel, and means passing through the cushion and connected to the central portion for limiting the outward movement of the shoes.

3. In a resilient wheel, a rigid central structure including a felly, a series of circumferentially disposed shoes with treads outside of the felly and each having an inwardly extending headed stem, a stop plate on the structure for each stem to limit outward movement thereof, means on the tread to prevent rotation thereof and a yielding support resting on the stop plate and bearing on a member of the respective shoe.

4. In a resilient wheel, a rigid central structure including a felly, a series of circumferentially disposed shoes with treads outside of the felly and each having an inwardly extending headed stem, a plate secured on said shoe inside the felly, a stop plate on the rigid central structure for each stem to limit outward movement thereof, and a yielding support resting on the stop plate and bearing on the inner plate of the respective shoe, the said support comprising a series of superposed blocks.

5. In a resilient wheel, a rigid central structure including a felly, a series of circumferentially disposed shoes with treads outside of and non-rotatively and slidably mounted on the felly and each having an inwardly extending headed stem, a stop plate on the structure for each stem to limit outward movement thereof, and a yielding support resting on the stop plate and bearing on the inner member of the respective shoe, the stem passing centrally through the said support, each of which is composed of a series of different sized blocks.

6. A resilient wheel comprising a rigid wheel structure with a felly, a series of circumferentially disposed shoes, each comprising an outer tread and an inner bearing plate connected together for guided non-rotative travel radially in the felly, a radial stem for each shoe extending inwardly from said plate, a wedge-shaped cushion disposed between the wheel spokes for each shoe and bearing upon the inner plate and through which the respective stem passes, said stem engaging a part of the wheel structure to limit outward movement of the shoe thereof.

7. A resilient wheel comprising a rigid central structure with a felly, and a tire therefor comprising an annular series of coordinate relatively independent shoes each having an outer tread plate with rigid parallel posts fitting apertures in the felly, a tie plate on the inner ends of the posts of each shoe, elastic cushions supported on the central structure and bearing outwardly against the several shoes, and radial stop rods passing through said cushions and connecting the outer plates and seating upon the central structure.

8. A resilient wheel comprising a rigid central structure with a felly, and a tire therefor comprising an annular series of coordinate disconnected shoes each having an outer tread plate with rigid parallel posts fitting apertures in the felly, a tie plate on the inner ends of the posts of each shoe, elastic cushions supported on the central structure and bearing outwardly against the several inner plates of the shoes, and means for supporting the cushions and limiting the outward movement of the shoes.

9. A resilient wheel comprising a rigid central structure with a felly, and a tire therefor comprising an annular series of coordinate shoes each having an outer tread plate with rigid parallel posts fitting apertures in the felly, a tie plate on the inner ends of the posts of each shoe, elastic cushions supported on the central structure and bearing outwardly against the several shoes, spokes supporting the felly and disposed between said cushions, sets of anti-friction bearings disposed between said posts and the adjacent spoke ends.

In testimony whereof I affix my signature.

JOHN JAMISON.

Copies of this patent may be obtained for five cents each, by addressing the "Commissioner of Patents, Washington, D. C."